United States Patent Office 2,907,803
Patented Oct. 6, 1959

2,907,803

PRECIPITATION INHIBITOR

Calvin Charles Rolland and Leslie Hunt Sutherland, New Orleans, La., assignors to American Cyanamid Company, New York, N.Y., a corporation of Maine No Drawing. Application October 26, 1956
Serial No. 618,446

4 Claims. (Cl. 260—679)

This invention relates to the purification of an acetylene-bearing gas. More particularly, it relates to inhibiting polymer precipitation in a solvent selective in its action to acetylenes.

In the manufacture of acetylene from hydrocarbons, e.g., by the partial oxidation of natural gas, the resultant acetylene-bearing gas is usually purified by treating it with a selective solvent whereby substantially all the acetylene as well as the higher acetylenes are absorbed, while the less soluble components pass off in the off-gas stream. The resultant solution of acetylenes is then treated to separate acetylene from the higher acetylenes and both from the solvent, the solvent then being recycled. Various solvents have been proposed and effectively employed in this purification system, one of the preferred being butyrolactone.

Although this purification system has been commercially employed to a considerable extent, it suffers from one serious disadvantage. Because of the presence of higher acetylenes in the reaction gas and the use of elevated temperatures in the purification system, polymer formation occurs. Polymer thus formed builds up in the solvent and tends to precipitate particularly in the presence of water. Resultant accumulations of polymer solids in the heat exchangers, stripping columns, lines and the like necessitates periodic shutdowns of equipment thus seriously limiting production.

One suggested method of minimizing the polymer content of the solvent is to treat a continuously withdrawn small slip stream of stripped solvent with water to precipitate polymer, which can then be separated by filtration prior to recycling of the solvent. This is not wholly satisfactory because of filtration problems caused by the fine size of the polymer. In addition, the problem of polymer precipitation within the purification system is aggravated because of the possibility of introducing additional water into the solvent. It also has been proposed to combat this problem by adding any of various chemical agents to the solvent believed to be capable of stabilizing the solution of higher acetylenes against polymerization. Although numerous materials have been proposed, none has been found to be particularly effective in reducing polymer formation.

There has continued to remain, therefore, a need for inhibiting the problem of polymer formation in the purification of acetylene. Particularly, there has been a continued need for reducing the frequency of shutdowns of the purification system for cleaning necessitated by the accumulation of precipitated polymer.

In accordance with this invention, these needs are met to a most unusual and unexpected degree. It now has been found that the precipitation of polymer can be greatly inhibited by incorporating in the solvent a compound of the formula

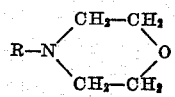

wherein R represents hydrogen or a lower alkyl radical of 1–4 carbons. In contrast to the previous use of chemical addition agents which are alleged to overcome the polymerization problem by stabilizing the solution, the agents of this invention do not reduce polymerization but appear to inhibit the precipitation of solids by forming a polymer considerably more soluble in a selective solvent or solvent-water system than heretofore obtained. At any rate, regardless of how it functions, the precipitation and accumulation of solids in the acetylene purification system is substantially reduced by the presence in the system of an inhibitor according to this invention.

The amount of inhibitor employed may be quite widely varied. Precipitation of polymer has been considerably inhibited in a solution containing as little as 0.01% by weight of inhibitor. Generally, the amount of inhibitor will be greater than this and may range to as high as 5% or more, although little added advantage appears to be gained by using these higher amounts. Usually, therefore, the amount of inhibitor will be less ranging from about 0.1% to about 1.0%.

To avoid a build up of soluble polymer in the solvent, a continuous slip stream of stripped solvent may be withdrawn and treated by any means which form no part of this invention to separate the polymer.

The following examples further illustrate the invention. Unless otherwise noted, all parts are by weight.

EXAMPLE 1

Samples comprising 50 parts water, 50 parts butyrolactone, 0.25 part diacetylene and each containing an inhibitor according to Table I are placed in sealed tubes and heated for 16 hours at 125° C. Two additional samples, sample 1 containing no inhibitor and sample 2 containing no inhibitor and no diacetylene, are used as controls and similarly treated. Each sample is then observed for polymer precipitation.

Table I

| Inhibitor | Sample No. | | | | | |
|---|---|---|---|---|---|---|
| | 1 | 2 | 3 | 4 | 5 | 6 |
| Morpholine | | | 0.5 | 1.0 | | |
| N-methylmorpholine | | | | | 0.1 | 1.5 |
| Polymer precipitation after 16 hrs | Yes | No | No | No | slight | No |

EXAMPLE 2

The reaction gas from a partial oxidation of methane is bubbled through butyrolactone at 90° C. and at a rate of 0.5 c.f.h. After 24 hours, the butyrolactone is mixed with 4 volumes of water. Solids are precipitated.

EXAMPLE 3

The procedure of Example 2 is followed except that the solvent contains 1.0% morpholine. On the addition of water to the solvent after 24 hours, no solids are precipitated.

Similar results are obtained using other lower alkyl derivatives of morpholine in varying amounts in accordance with this invention. Polymer precipitation in also inhibited in the same manner when using selective solvents other than butyrolactone.

We claim:

1. In the preparation of acetylene in which an acetylene-bearing gas is treated with a butyrolactone whereby acetylene and higher acetylenes are absorbed, the method of inhibiting polymer precipitation which comprises: incorporating therein from about 0.01–5.0% by weight of a compound of the formula

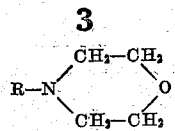

in which R is selected from the group consisting of hydrogen and lower alkyls of 1–4 carbon atoms.

2. A process according to claim 1 in which the compound is morpholine.

3. A process according to claim 1 in which the compound is N-methylmorpholine.

4. A process according to claim 1 in which the compound is present in about 0.1%–1.0% by weight.

References Cited in the file of this patent

UNITED STATES PATENTS

| | | |
|---|---|---|
| 1,924,979 | Calcott et al. | Aug. 29, 1933 |
| 2,062,201 | Bartram | Nov. 24, 1936 |
| 2,405,693 | Hamill et al. | Aug. 13, 1946 |
| 2,715,104 | Nelson | Aug. 9, 1955 |